(12) United States Patent
Short

(10) Patent No.: US 8,666,652 B2
(45) Date of Patent: Mar. 4, 2014

(54) SYSTEM AND METHOD FOR RUNNING STORED STATISTICAL PROCESSES USING A WEB-BASED GRAPHICAL INFORMATION SYSTEM

(75) Inventor: Eric Lee Short, Apex, NC (US)

(73) Assignee: SAS Institute Inc., Cary, NC (US)

(*) Notice: Subject to any disclaimer, the term of this patent is extended or adjusted under 35 U.S.C. 154(b) by 1005 days.

(21) Appl. No.: 12/241,745

(22) Filed: Sep. 30, 2008

(65) Prior Publication Data

US 2010/0082240 A1 Apr. 1, 2010

(51) Int. Cl.
*G01C 21/00* (2006.01)
*G08G 1/123* (2006.01)

(52) U.S. Cl.
USPC ...................... 701/408; 340/995.14

(58) Field of Classification Search
USPC ............. 701/200–226, 400–541; 340/995.14; 707/E17.009, E17.119, E17.01, 707/E17.032, E17.11; 345/427
See application file for complete search history.

(56) References Cited

U.S. PATENT DOCUMENTS

| | | | |
|---|---|---|---|
| 7,243,030 B2 * | 7/2007 | Reeve et al. | 702/19 |
| 2003/0193502 A1 * | 10/2003 | Patel et al. | 345/440 |
| 2004/0054475 A1 * | 3/2004 | Grace | 702/1 |
| 2009/0089254 A1 * | 4/2009 | Von Kaenel et al. | 707/3 |
| 2009/0327202 A1 * | 12/2009 | Felke et al. | 706/52 |

* cited by examiner

*Primary Examiner* — Muhammad Shafi
(74) *Attorney, Agent, or Firm* — Kilpatrick Townsend & Stockton LLP

(57) ABSTRACT

Computer-implemented systems and methods are provided for displaying analytic geography data in a zero-footprint client environment. Data indicative of a geographic focus area is received via a first user interface region that displays a geographical map from a geographical information system that is executable on a first server, the geographical information system configured to capture, store, analyze, and manage data and associated attributes that are spatially referenced to earth. Data indicative of a selected analytic routine is received via a second user interface region that displays a plurality of candidate analytic routines. The selected routine and data indicated by the selected analytic routine are accessed from a second server. The selected analytic routine is executed using the accessed data and the geographic focus area to produce analytic results, and the analytic results are provided to the user interface display for presentation with respect to the geographic map, wherein the candidate analytic routines are statistical models for generating analytic results.

21 Claims, 12 Drawing Sheets

SYSTEM AND METHOD FOR RUNNING STORED STATISTICAL PROCESSES USING A WEB-BASED GRAPHICAL INFORMATION SYSTEM

TECHNICAL FIELD

This document relates generally to computer-implemented geographic mapping applications and more particularly to geographical analysis systems.

BACKGROUND

Zero footprint applications are computer applications which require end users to install little, if any, software. Examples include web-based e-mail applications such as Yahoo Mail®, GMail®, and Hotmail®. Zero footprint applications provide advantages for both the application service provider and the end users. End users benefit from a high level of accessibility to the application, such as through the World Wide Web, and ease of use. Application providers are able to control the user interface and can control software updates from the network. These applications offer interactivity and functionality to more users without requiring an install, as well as offering a convenient mechanism for sharing and centralizing data.

Another major driver of zero footprint applications are corporate and government environments, where end users are often prohibited from installing applications to their PCs or laptops. In such environments, the deployment of zero footprint applications is often much simpler compared to traditional applications, which require installation, because the former can be released immediately while the latter typically requires certification and security reviews.

One type of zero footprint applications is geographic information systems. A geographic information system is an information system for capturing, storing, analyzing, managing, and presenting data which is spatially referenced (e.g., linked to a location). Geographic information systems may be used for scientific investigations, resource management, asset management, environmental impact assessment, urban planning, cartography, criminology, geographic history, marketing, and logistics to name a few. For example, a geographic information system might allow emergency planners to calculate emergency response times in the event of a natural disaster or to find wetlands that are in need of protection.

The use of zero footprint applications for geographical information systems presents difficulties. One such difficulty involves creating usable business logic in such a way that it can be shared across applications in a controlled fashion. To date, geographic information systems available in zero footprint environments tend to be simplistic in contrast to their dedicated full-scale counterparts.

As an illustration, FIG. 1 is a block diagram depicting a prior art geographical information system 30. A user 32 is able to access the geographical information system 34 through one or more servers 36. For example, a user 32 may request the display of a map through a zero footprint client, such as a webpage in a web browser. The user request is forwarded to the geographical information system 34 via the one or more servers 36. Upon receiving the request, the geographical information system 34 may access data from a geographic data set stored in one or more data stores 40. This data 38 accessed from the data stores 40 may be the data necessary to generate the graphical map requested by the user 32. Upon receiving the data 38, the geographical information system 34 generates the requested map and transmits the map data to the user 32 via the one or more servers 36 for display in the zero footprint client.

As another illustration, FIG. 2 depicts output of a geographical information system identifying an address on a map 50. This map was accessed from Google® Map Data. A user may request the map 50 depicted in FIG. 2 by entering the address, "121 N. Monroe St., 16354" into an map address dialog box on a web page in a web browser. The request is sent through the World Wide Web to a server where the requested map data is accessed, processed, and provided for viewing by the user on the web page in the web browser.

As yet another illustration, FIG. 3 depicts output of a geographical information system that provides directions for traveling between two points on a map 60. This map was accessed through the Yahoo® Local Maps application. A user may request a map similar to the map 60 depicted in FIG. 3 by entering two addresses in a "Get Map and Directions" dialog box on a web page in a web browser.

SUMMARY

In accordance with the teachings provided herein, computer-implemented systems and methods are provided for displaying analytic geography data in a zero-footprint client environment. As an illustration, a system may include a geographical information system executable on a first server and configured to capture, store, analyze, and manage data and associated attributes that are spatially referenced to a geographical map. The system may further include a first user interface region for display on a client computer that provides a list of analytic routines for selection by a user and a second user interface region for displaying a geographical map on the client computer for use in specifying geographic data associated with the geographical map. The system may also include a second server having a plurality of analytic routines corresponding to the list of analytic routines displayed by the user interface display. The plurality of analytic routines may be statistical models for generating analytical results, where the analytic routine, which is configured to operate on the second server and that corresponds to the analytic routine selected through the first user interface region, is executed on the second server using the geographic data specified through the second user interface to generate analytic results. The analytic results may be sent to the user interface display for display with respect to a geographical map.

As another illustration, a computer-implemented system for displaying analytic geography data on a user interface display in a zero-footprint client environment may receive data indicative of a geographic focus area via a first user interface region that displays a geographical map from a geographical information system executable on a first server that is configured to capture, store, analyze, and manage data and associated attributes that are spatially referenced to earth. The system may further receive data indicative of a selected analytic routine via a second user interface region that displays a plurality of candidate analytic routines. The system may access data indicated by the selected routine from a second server as well as the selected analytic routine. The system executes the selected analytic routine utilizing the accessed data and the geographic focus area to produce analytic results and provides the analytic results to the user interface display for presentation with respect to the geographical map. The candidate analytic routines may be statistical models for generating analytical results.

As a further illustration, a computer-implemented system for displaying analytic geography data on a user interface display in a zero-footprint client environment may receive user credential information. The system may provide a category list in a first user interface region containing groups of analytical routines that a user is permitted to access based on credential information associated with the user. The system may receive category selection information identifying the group of analytical routines to be accessed by the users, and the system may provide a list of analytical routines in the first user interface area based on the received category selection information, where the plurality of analytic routines are statistical models for generating analytical results. The system may also receive data indicative of a geographic focus area via a first user interface region that displays a geographic map on a client computer, where the first user interface is provided by a geographical information system executable on a first server and configured to capture, store, analyze, and manage data and associated attributes that are spatially referenced to the geographical map. The system may access data indicated by the selected group of analytical routines to be accessed from a second server, where data stored on the second server is secure such that the user is granted access to the accessed data based on an evaluation of the user credential information. Initial indicators may be displayed on the geographic map highlighting initial variable values derived from the accessed data. The system may receive data indicative of a selected analytic routine from the first user interface region and access the selected analytic routine from the second server. The system may then execute the selected analytic routine utilizing the accessed data and the geographic focus area to produce analytic results. The system may provide the analytic results to the user interface display for presentation with the geographic map. The analytic results may be presented on the user interface through a change on the geographical map in the second user interface region with respect to one or more of the initial indicators, where the map includes final indicators identifying final variable values. The final indicators may be modified to reflect the final variable values based on the generated analytical results.

DETAILED DESCRIPTION

Figure 1:
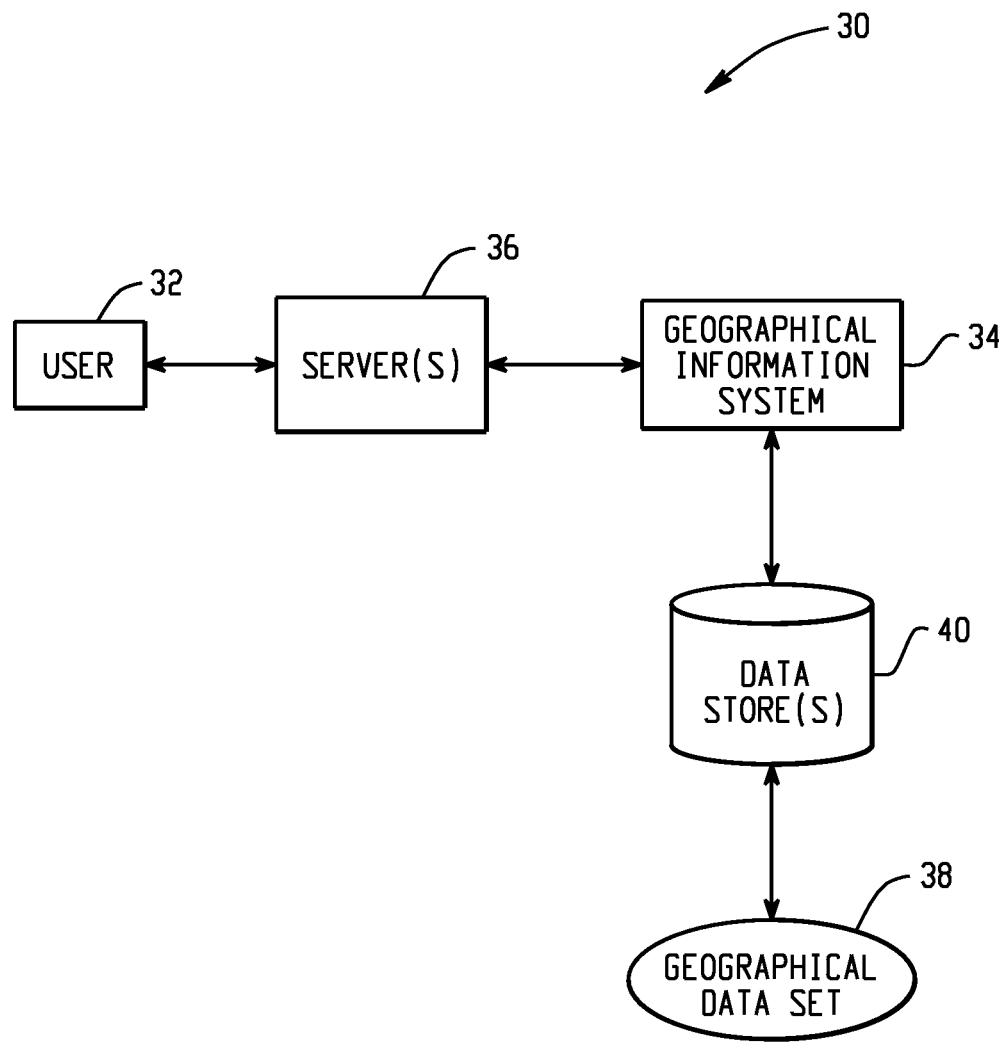
FIG. 1 is a block diagram depicting a geographical information system.
Figure 2:
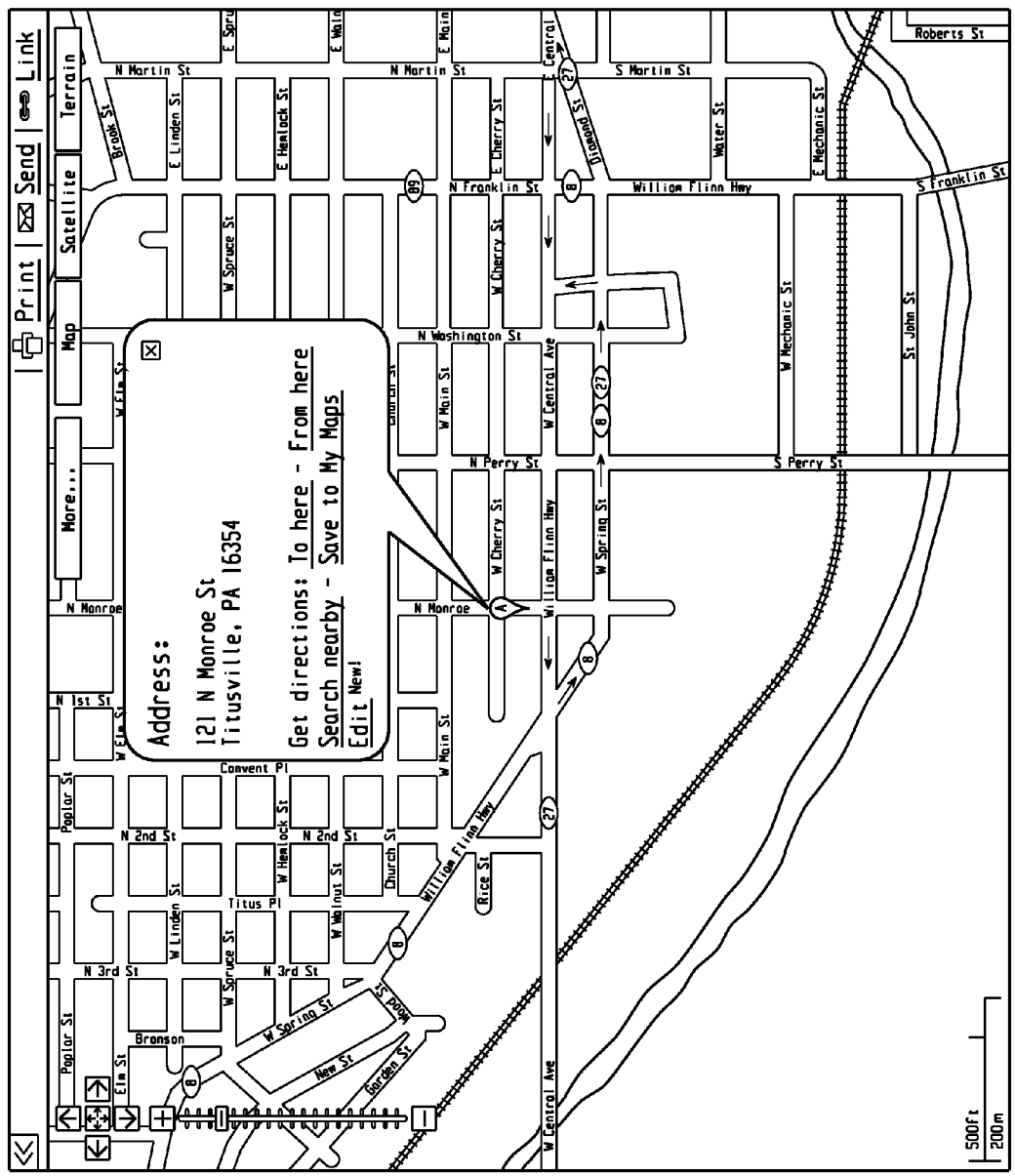
FIG. 2 is an illustration of a sample output of a geographical information system identifying an address on a map.
Figure 3:
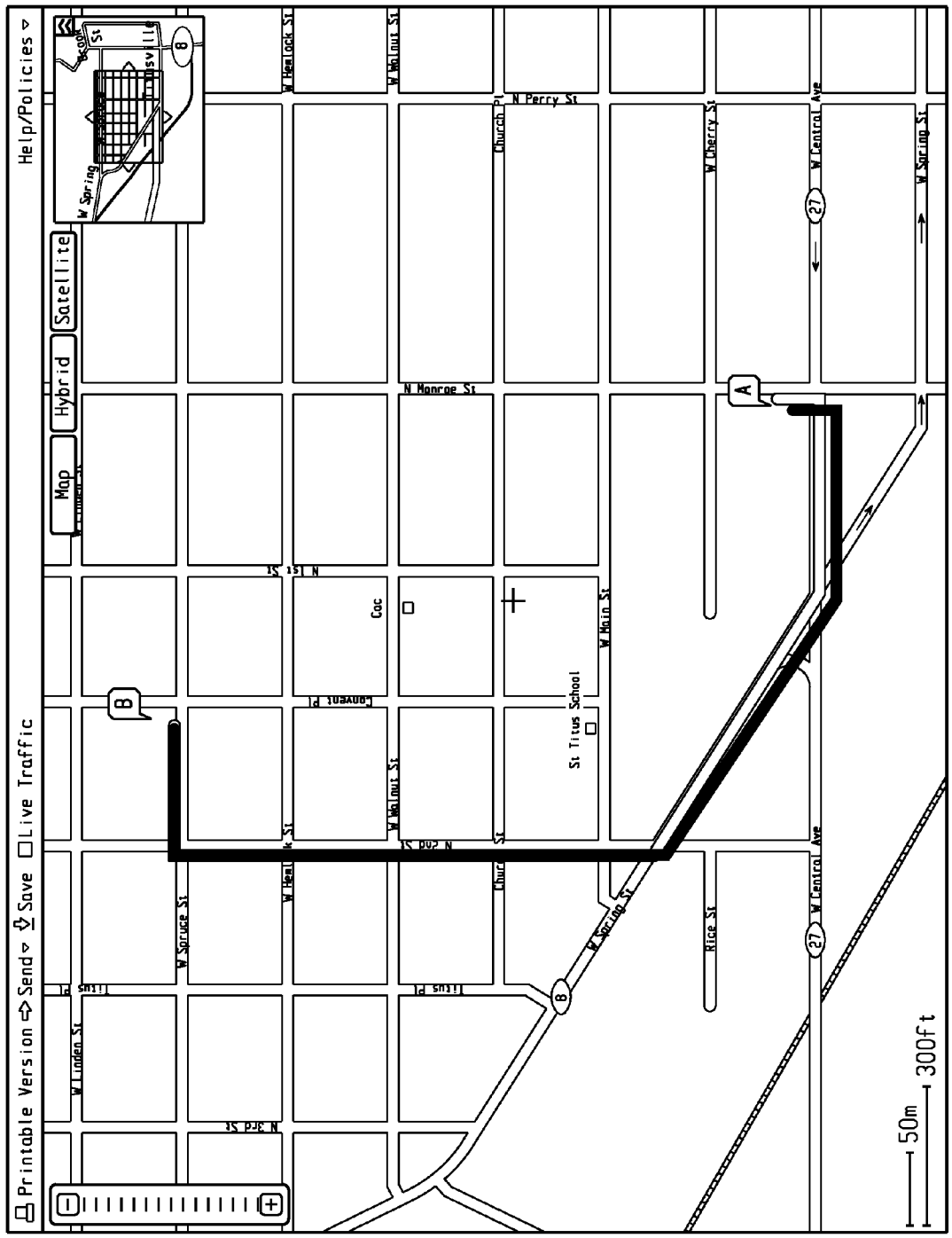
FIG. 3 is an illustration of another sample output of a geographical information system depicting directions for travel between two points on a map.
Figure 4:
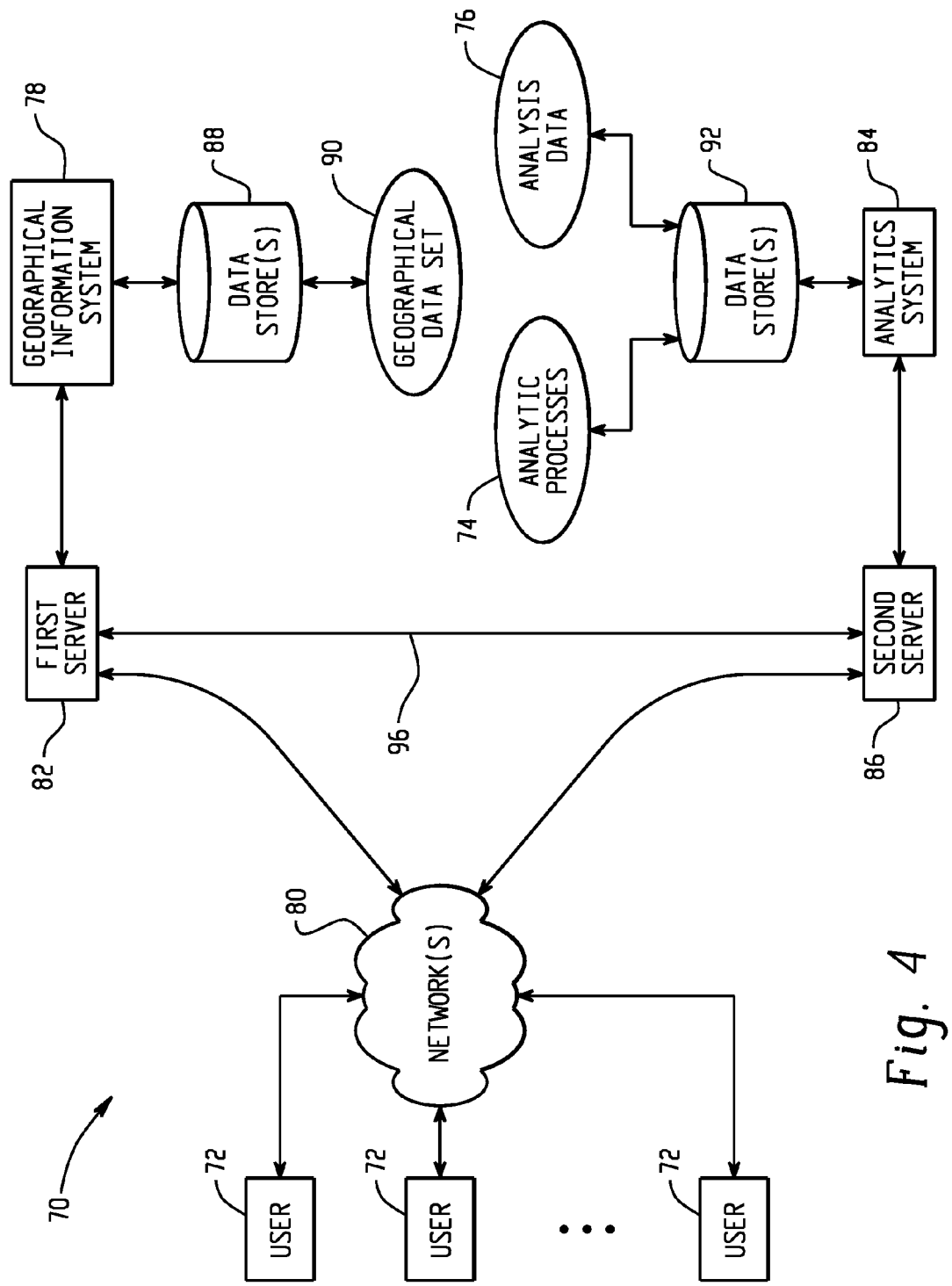
FIG. 4 is a block diagram depicting a computer-implemented environment wherein users can execute stored analytic processes and analytic data with respect to a geographical information system.

FIG. 4 depicts at 70 a computer-implemented environment wherein users 72 can execute stored analytic processes 74 and access analytic data 76 with respect to a geographical information system 78 over network(s) 80 through a zero footprint web-based application. The application combines data from a graphical information system 78 housed on a first server 82 with results of analytic processing by an analytics system 84 stored on a second server 86.

In the example of FIG. 4, the geographic information system 78 resides on a first server 82 and provides data and displays geographic data such as a map to a user 72 through network(s) 80 such as the Internet. One or more data stores 88 can store the data to be utilized by the geographical information system 78 as well as any intermediate or final data generated by the geographic information system 78. Examples of data store(s) 88 can include relational database management systems (RDBMS), a multi-dimensional database (MDDB), such as an Online Analytical Processing (OLAP) database, etc. Geographic data 90 stored in the data stores 88 may include map data including metadata about features of elements of the map such as distances between points on a map and elevations. The geographical information system 78 accesses the geographic data 90 stored in the data stores 88 to provide geographic displays to the user 72, such as a map of a requested location, through the network 80 via the first server 82.

The application further includes an analytics system 84 that resides on a second server 86. One or more data stores 92 store analytic processes 74 and analysis data 76. The analytic processes 74 may include processes such as locationally aware statistical models that utilize map data as inputs. For example the analytic processes may be SAS® Stored Procedures residing on a SAS Stored Process Server. This map data input may be received from the geographical information system 78 through communications between the first server 82 and the second server 86 as shown at 96.

The analysis data can include other input data for the analytic processes such as demographic data, sales data, store location data, etc. The analytics system 84 provides access to the analytic processes 74 and analysis data 76 over the network(s) 80. The analytics system 84 works in conjunction with the graphical information system 78 such that analytic processes 74 may operate upon certain geographical areas or features, and the results of analytic process 74 may be displayed to the user on or near a map provided by the geographical information system 78 in the zero footprint environment.

Figure 5:
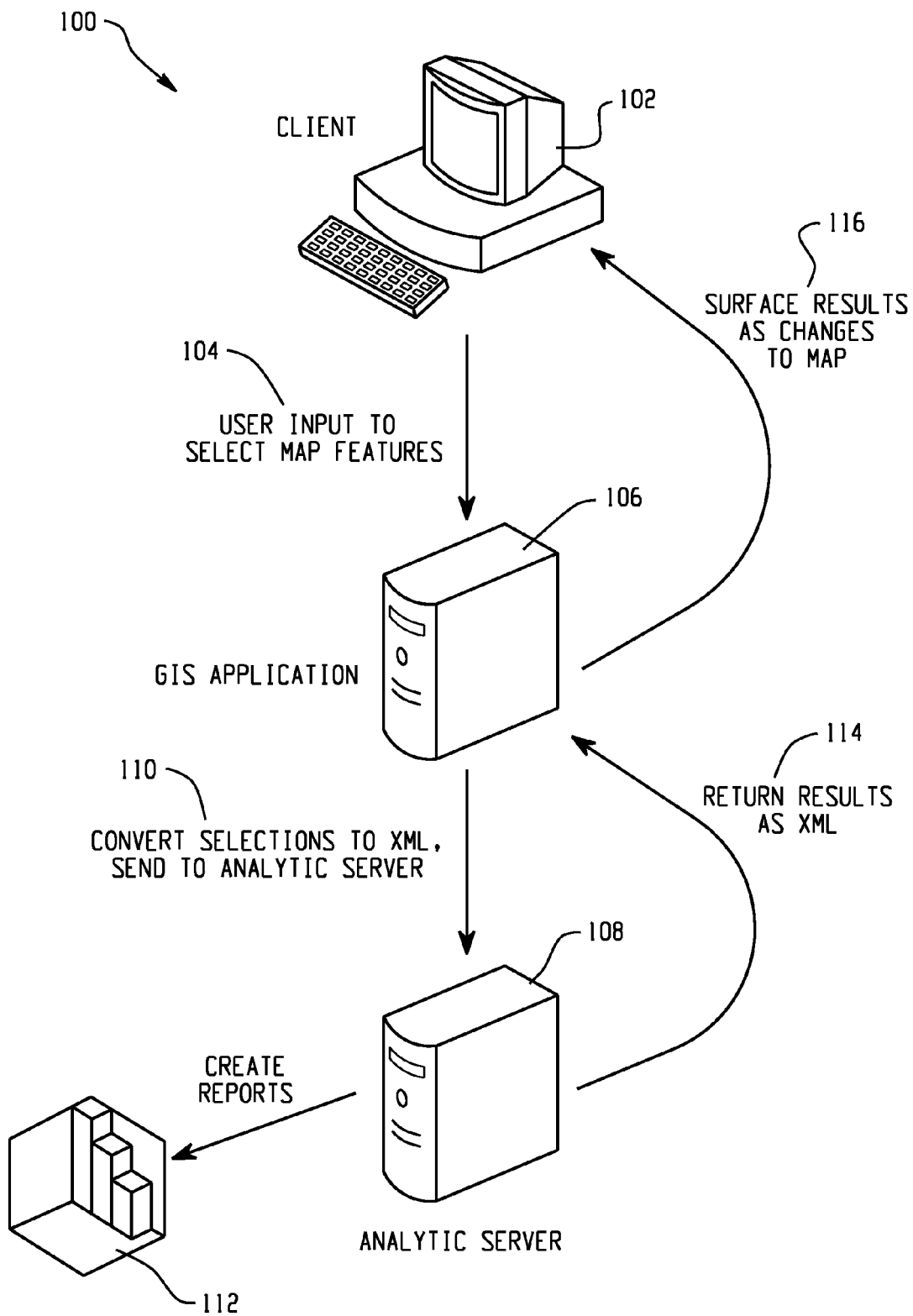
FIG. 5 is a flow diagram illustrating a sample request for execution of an analytic process with respect to a geographical map.

FIG. 5 is a flow diagram illustrating a sample request for execution of an analytic process with respect to a geographical map. A user inputs commands at a client computer 102 selecting one or more analytic processes to be executed and relevant map areas or features to be included as input to the selected analytic process. The selection of map areas and features may be accomplished by selecting a portion of a map provided to the client computer 102 by the graphical information system 106. Additionally, this selection may be accomplished by entering a street address or coordinates at the client computer 102, as well as other means of identifying a location of interest.

Following input entry by the user, the selected map features and analytic process information are received by the geographical information system 106. The system converts the selections and any geographic data required as inputs for the selected analytic inputs to an XML or other suitable format for forwarding to the analytic server 110. Geographic data forwarded to the analytic server 108 may include the boundaries and details of the selected geographical area such as elevations, waterways, street layouts, as well as other details. Following packaging of the request and data into an XML format (or other type format) by the graphical information system 106, the XML data is sent to the analytic server as shown at 110.

The analytic server 108 receives the packaged data and analysis request propagated by the geographical information system 106. Upon receiving a request, the analytic server 108 accesses the requested analytic process as well as any other input data for the selected analytic process that the analytic server 108 has not yet received. The analytic process and other input data may be stored in a secure manner locally on the analytic server 108 or on one or more remote data stores such that only authorized users are permitted to access certain analytic processes and input data. Permissions to access analytic processes and other input data may be determined from a username and password, certificate information, or other credential information supplied by the user at the client computer 102. Security aspects are discussed in further detail below with respect to FIG. 9. The other input data that may be accessed by the analytic server 108 as inputs for a requested analytic process may include a wide variety of data including demographic data, store location data, sales data, population trend data, construction site data, crime rate data, distribution center data, as well as many others.

Following gathering of all necessary inputs, the analytic server 108 executes the selected analytic routine to create reports as shown at 112. These reports may be presented in many different forms such as different types of graphs (e.g., bar graphs, line graphs, pie charts, etc.) to appear on or near an output map, tabular data for presentation on or near an output map, modifications to indicators that appeared on a map previously presented at the client computer 102, new indicators to be presented on an output map at the client computer, as well as others. The results of the running of the requested analytic process are returned to the geographical information system 106 as an XML stream (or other data format) as illustrated at 114. The geographic information system may perform processing on the received stream. This processing may include adding/modifying indicators to be included on an output map and formatting output data calculated and propagated by the analytic server. These results are then forwarded to the client computer 102 for display in a zero footprint application as illustrated at 116.

Figure 6:
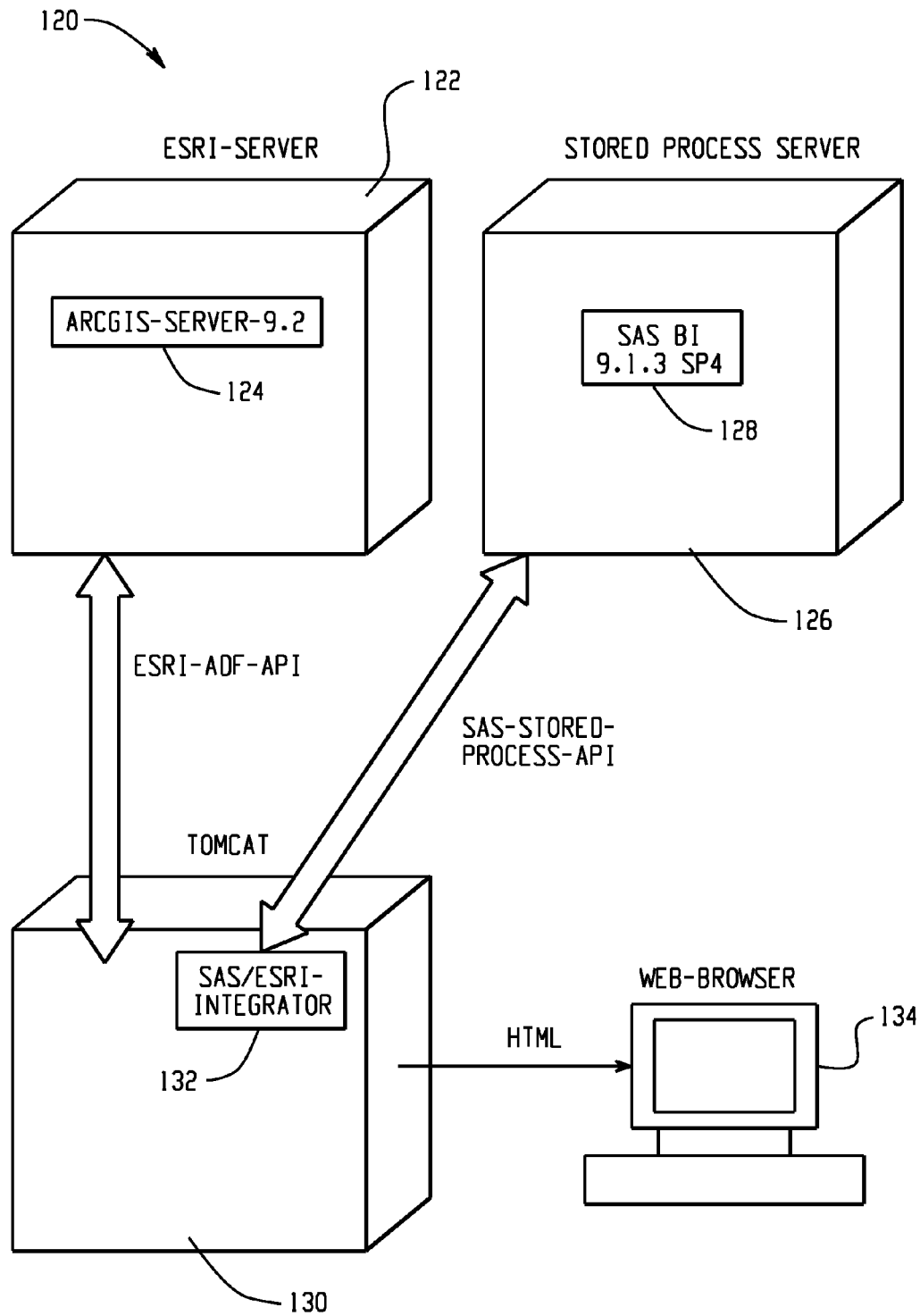
FIG. 6 is a block diagram depicting an exemplary environment for executing locationally aware analytic processes with a geographic information system.

FIG. 6 depicts an example environment 120 for executing locationally aware analytic processes with a geographic information system. The environment 120 includes an Environmental Systems Research Institute® (ESRI) server 122 running ArcGIS® Server version 9.2 geographical information system software 124. The system further includes a stored process server 126 running SAS BI server software 128 version 9.1.3, service pack 4.

The example configuration of FIG. 6 further includes an Apache Tomcat module 130 that contains instructions 132 for integration and communication of data and commands among the ESRI server 122, the stored process server 128 and the client computer and web browser 134. This integration among the Tomcat module 130, the ESRI server 122, and the stored process server 126 may be through XML, HTML, or other appropriate form. The integration instructions 132 combine the geographical information system data from the ESRI server 122 and the output data from the stored process server 128 to create an appropriately formed output (e.g., HTML) for presentation in the zero footprint environment on the client computer 134. It should be noted that the integration instructions 132 residing on the Tomcat module may be stored on the ESRI Server 122, the stored process server 126, or on a separate server while still achieving the required results.

Figure 7:
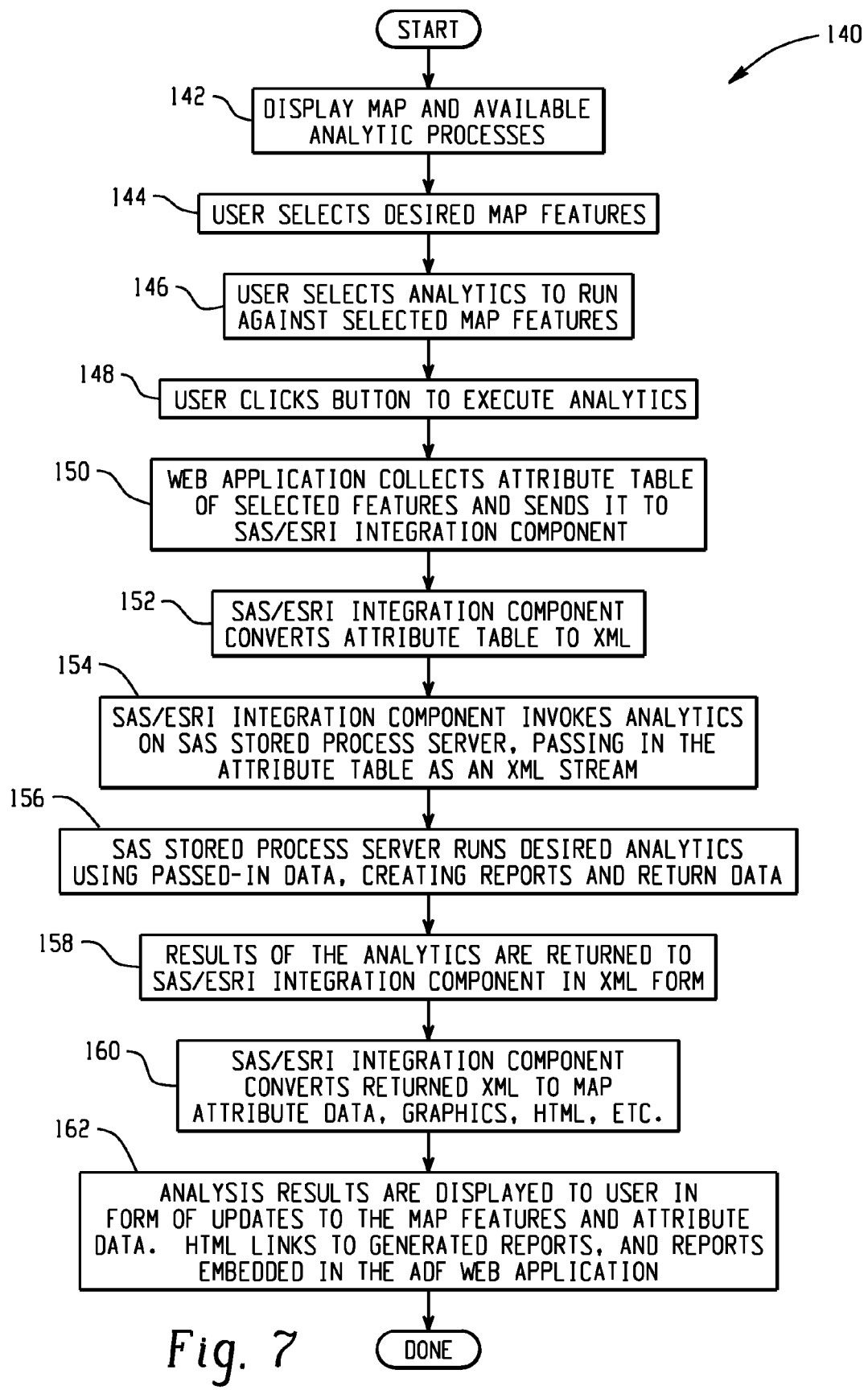
FIG. 7 is a flow diagram illustrating steps for selecting, executing, and displaying results of an analytic process with respect to a geographic map.

FIG. 7 is a flow diagram 140 illustrating steps for selecting, executing, and displaying results of an analytic process with respect to a geographic map. The process begins at 142 where a map and available analytic processes are displayed to a user in a zero footprint environment. The user display may be in any of several forms. For example, a listing of categories of analytic processes may be displayed to the user. Following selection of a category, the user may be presented with an appropriate map and analytic processes in that category to which the user has sufficient permission to access. The initially displayed map may display some initial data or indicators relevant to the selected category of analytic processes. For example, an initial map might present indicators of current school locations when a school district delineation category of analytic processes is selected.

The user selects desired map features or regions as shown at 144 using a selection method such as dragging a box around an area on the displayed map using a pointing device, entering an address or coordinates, or other methods. The user further selects an analytic process to be run against the selected map feature 146 and instructs the zero footprint application to execute the selected analytics as indicated at 148. A web application collects data related to the selected features or regions on the map from a geographical information system as shown at 150 and forwards the collected data to integration instructions which package the data and requested analytics as an XML request as shown at 152. The integration instructions propagate the XML request 154 to an analytics server as an XML stream, and the analytics server collects any additional necessary data, runs the desired analytic process, and creates reports from determined outputs at 156.

The data output and reports from the analytics server are returned to the integration component as an XML stream at step 158. The integration component receives the results and converts the returned XML data to map attribute data (e.g., modified or new indicators), graphics, charts, links, or other HTML for display in the zero footprint client as depicted at 160. The integration component may, for example, use a plugin architecture to process the returned XML, which allows customization of the integration component such that the XML can be extended to drive the creation of different types of desired presentations. For example, plugins may convert the XML into attribute data for inclusion on the map, additional graphics to display on the map, or embedded reports within the zero footprint display. The analysis results are then displayed to the user in one of several forms that includes updates to the map features and attribute data, HTML links to generated reports, reports embedded in the zero footprint display, etc. as shown at 162.

Figure 8:
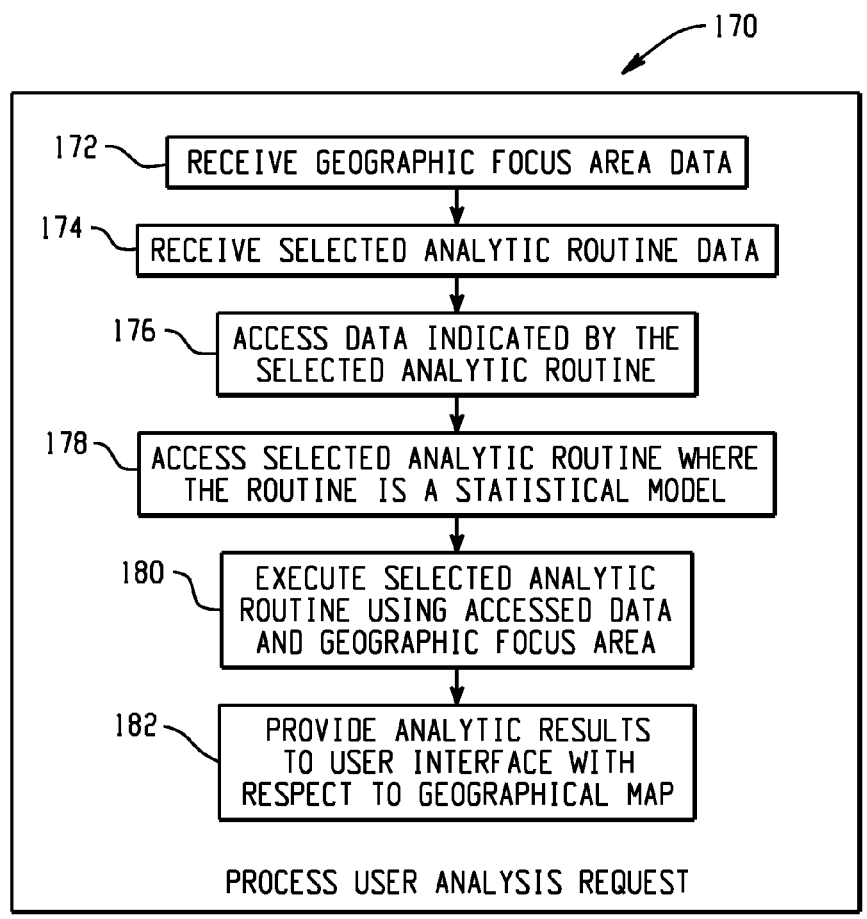
FIG. 8 is a flow diagram illustrating steps for processing a user analysis request.

FIG. 8 is a flow diagram 170 illustrating steps for processing a user analysis request. In the computer-implemented method for displaying analytic geography data on a user interface display in a zero-footprint client environment of FIG. 8, data indicative of a geographic focus area is received at 172 via a first user interface region that displays a geographical map from a geographical information system that is executable on a first server. The geographical information system is configured to capture, store, analyze, and manage data and associated attributes that are spatially referenced to earth. Data indicative of a selected analytic routine is received as shown at 174 via a second user interface region that displays a plurality of candidate analytic routines. Examples of analytic routines include methods for fitting predictive models (such as linear regression models, generalized linear models, or neural networks), forecasting, and simulation. Data indicated by the selected analytic routine is accessed at 176, and the selected analytic routine is accessed at 178. The selected analytic routine is then executed at 180 using the accessed data and the geographic focus area to produce analytic results, and the analytic results are provided to the user interface display for presentation with respect to the geographical map at 182.

Figure 9:
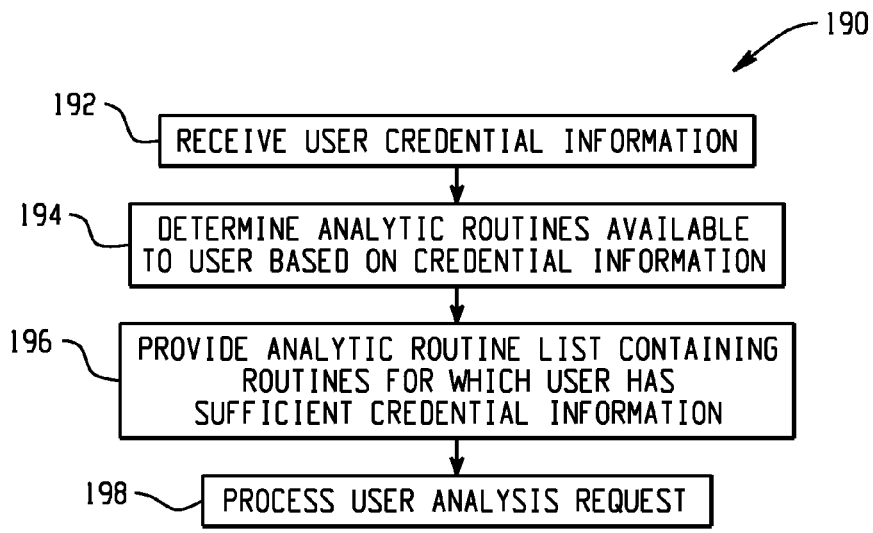
FIG. 9 is a flow diagram illustrating steps for processing a user analysis request in light of the user's credential information.

FIG. 9 is a flow diagram 190 illustrating example steps for processing a user analysis request in light of the user's credential information. At 192 user credential information is received. User credential information may be in a variety of forms. It may be a user/password challenge, a user supplied certificate, a fingerprint, a retina scan, or other forms. The user credential information may be supplied at different times including along with a request to perform analytic routine. In the example of FIG. 9, the user credential information is supplied before a user selects the analytic routine to be executed.

Following receipt of the user credential information, a determination is made as to which analytic routines are available to the user based on the permissions associated with the supplied credentials at 194. The zero footprint environment may be arranged such that all users may access any data available on the geographical information system, and access to data on the analytic server and other non-graphical information system servers is restricted according to user credentials. The determination may consider user permissions for individual analytic routines as well as permissions for the secured data. If a user does not have permissions to access an analytic routine, or if a user does not have permission to access required input data for an analytic routine, then that analytic routine will not be offered to the user in the analytic routine selection menus.

Following the permissions evaluation 194, an analytic routine list is provided to the user at 196 containing analytic routines for which the user has sufficient permissions. The user selects an analytic routine to be performed and the user's analysis request is processed as illustrated at 198.

Figure 10:
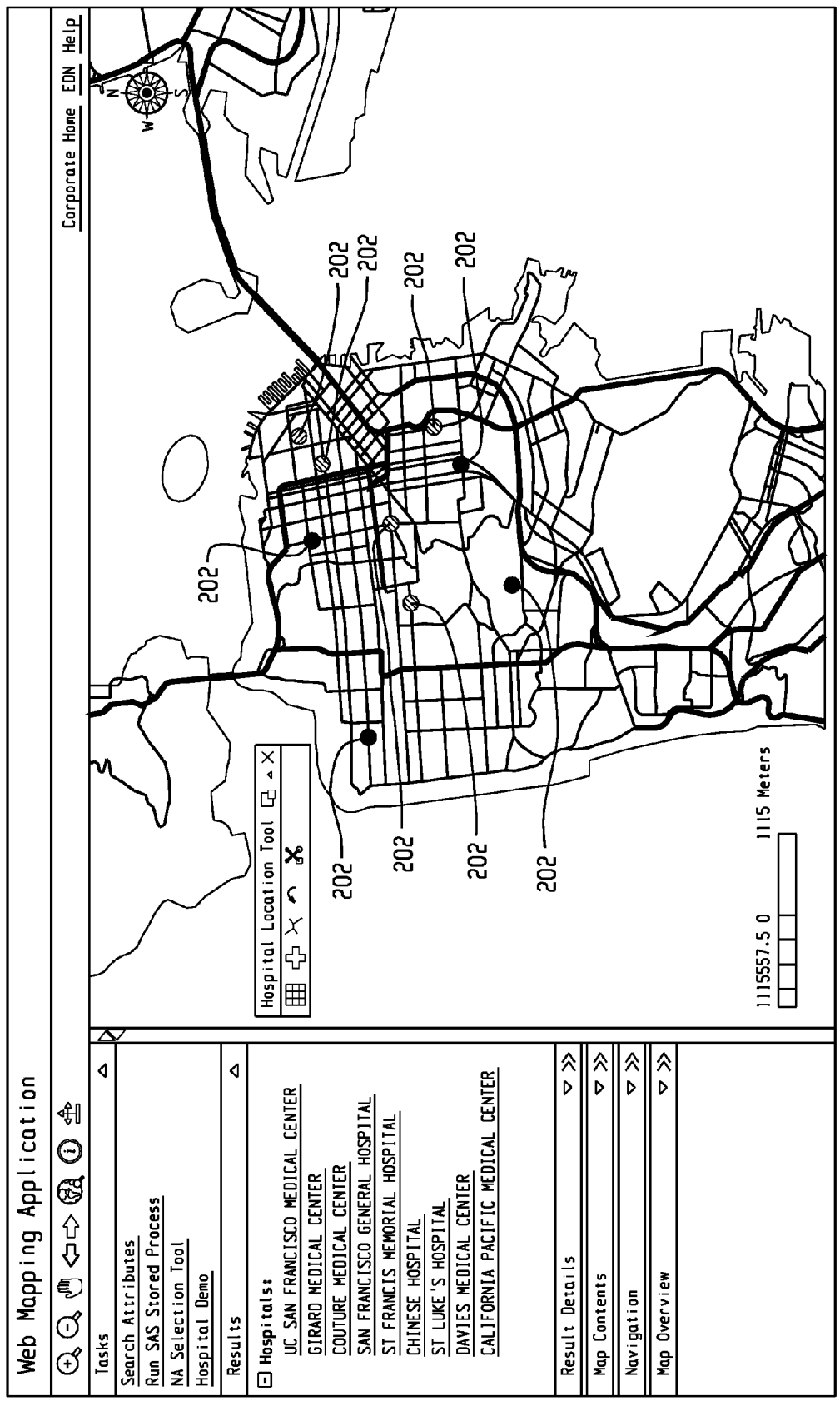
FIG. 10 is a depiction of an example implementation of geographical analysis system before execution of a selected analytic routine.

FIGS. 10-13 depict an example zero footprint application flow. FIG. 10 is a depiction of an example implementation of geographical analysis system 200 before execution of a selected analytic routine in a zero footprint environment. In this example, a map of San Francisco is shown, overlaid with a marker layer in which each circle marker 202 represents a hospital in San Francisco colored by the amount of expected wait time during a visit to the emergency room. This screen may have been accessed by a user, for example, following a selection by the user indicating a desire to do hospital wait time analytics. After this selection is made, initial processing of the data is performed in order to produce the initial display shown in FIG. 10. In this example, the initial data is representative of existing hospitals in the San Francisco area. The map data depicted in FIG. 10 is stored in the graphical information system, and the hospital location and attribute data are stored in a separate data store responsive to the analytic server.

Figure 11:
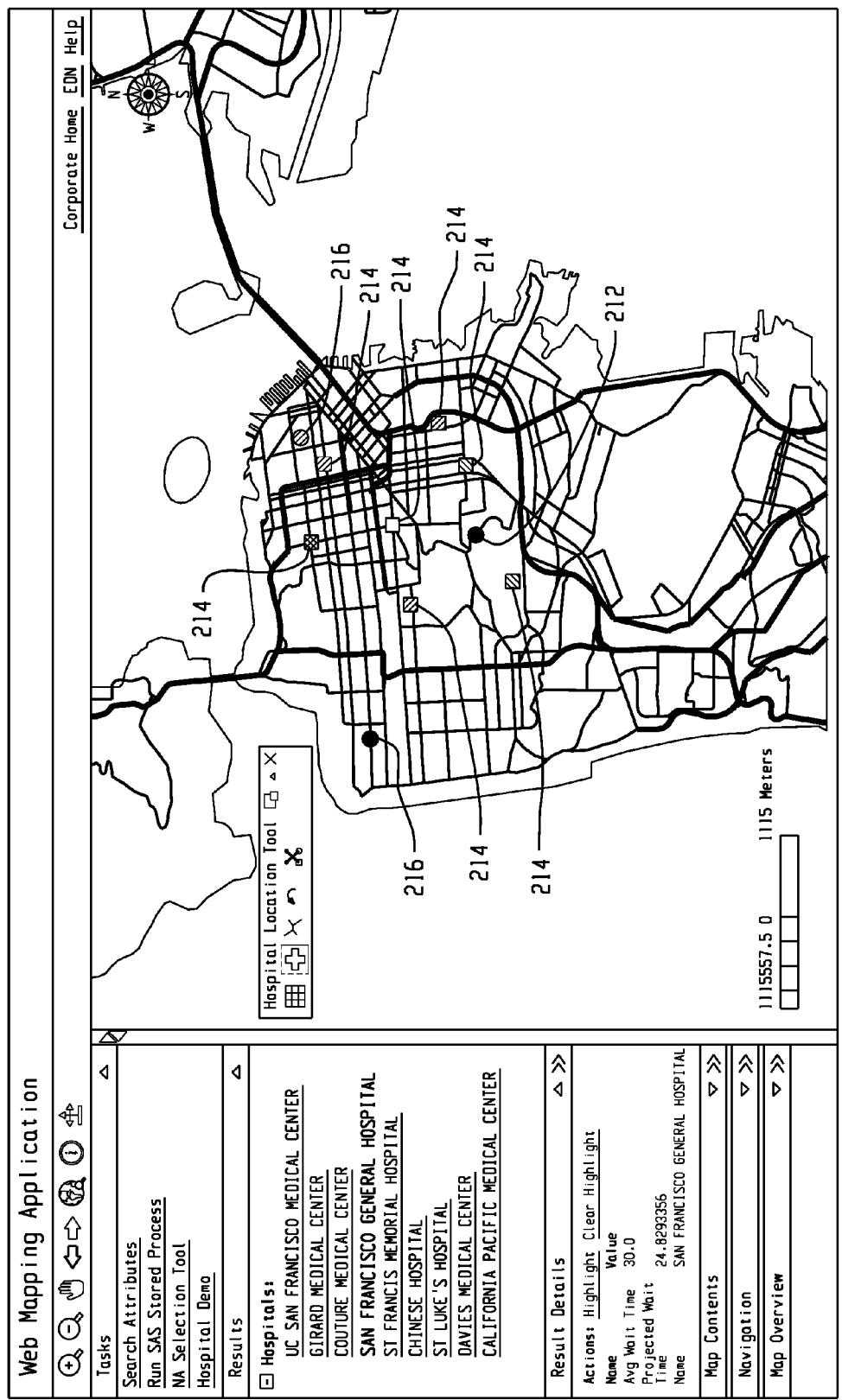
FIG. 11 is a depiction of an example implementation of geographical analysis system after execution of a selected analytic routine.

FIG. 11 is a depiction of an example implementation of geographical analysis system after execution of a selected analytic routine. In this example, a user has proposed a new hospital location by clicking on the map at a desired location 212. An analysis was then run to calculate how that new location might affect the expected wait times at surrounding hospitals. The location of the proposed new hospital is sent to the analytics software, and then a statistical model is executed based on the proposed new hospital for generating the analytic data results. The analytic routine in this example could perform a discrete event simulation to predict the distribution of wait times under various conditions. Hospitals that have wait times affected by the new hospital location are depicted in FIG. 11 using white-outlined square markers 214, instead of circles, that are colored according to the amount of expected emergency room wait time in light of the proposed hospital. Unaffected hospitals retain their circle markers 216.

This example illustrates the integration of data and business logic, in the form of a statistical model in an analytic process, with a zero footprint geographic information system. Placement information about the new hospital is sent to the analytic process as XML. Map information, including distances between hospital locations, is supplied to the analytic process by the geographic information service. After the calculations are done, appropriately themed markers are placed on the map using XML data returned by the analytic process. The information returned is in the form of graphics and information that are displayed in the client zero footprint geographical information system application.

Figure 12:
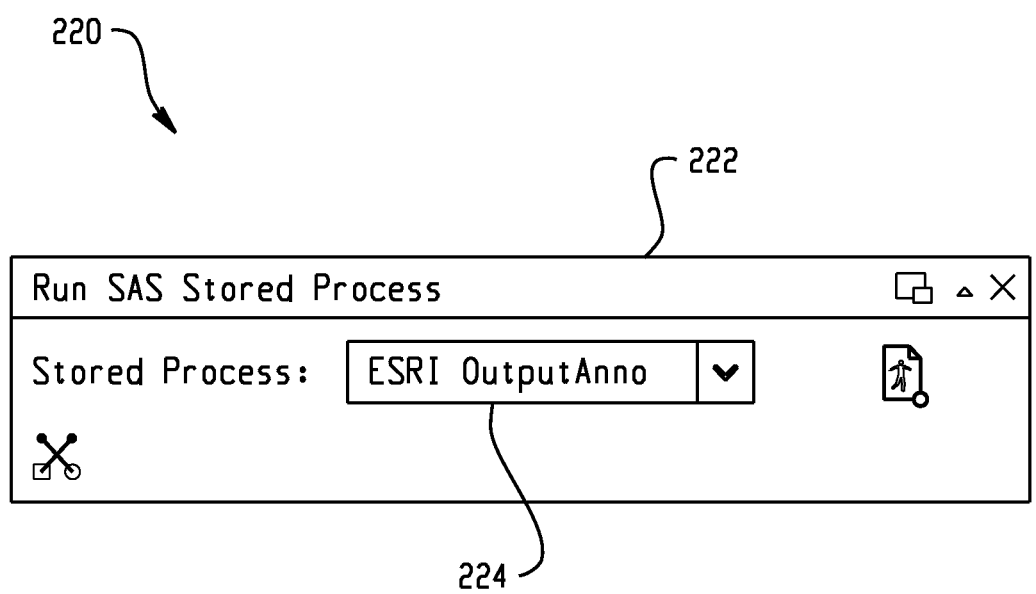
FIG. 12 is a depiction of a dialog box for selecting an analytic routine to be executed.

FIG. 12 is a depiction of a dialog box 222 for selecting an analytic routine to be executed. This dialog box may be displayed following the analytic processing and display of the user interface depicted in FIG. 11. The dialog box 222 contains a list of additional analytic routines that may currently be executed. These analytic routines may be based on previously entered and executed data and routines, or the routine may require input of new parameters or geographical selections. In the example of FIG. 12, the stored process, "ESRI OutputAnno," is depicted. This analytic process computes and displays data annotations and reports further describing the depicted state shown on the San Francisco map. These annotations and reports may be saved and shared with other interested parties. The analytic routines could perform additional simulations or fit a descriptive model of the results from previous simulations.

Figure 13:
FIG. 13 is a depiction of an example implementation of an analytic process server integrated with a geographic information system after execution of a selected analytic routine that includes a graph depicting analytic results.

FIG. 13 is a depiction of an example implementation 230 of an analytic process server integrated with a geographic information system after execution of a selected analytic routine that includes a graph 232 depicting analytic results. Following selection of the "ESRI OutputAnno" stored process from the dialog box, a report 232 is created by the analytics system that is surfaced as a savable stand-alone report 232 that is displayed within the zero footprint client application 230. In the example of FIG. 13, drive times among selected streets are calculated by the analytics system following selection of the "ESRI OutputAnno" stored process and are output in the form of a graph depicting the number of minutes that the data model within the stored process estimates it would take to traverse a selected road segment.

As an additional example in a different context, an analytic process may be included that determines a likelihood that a home mortgage will default in the near future. Secure input data may include personal data such past payment history, loan application information, and other account activity. Input data, such as demographic and psychographic information, may also be included from other sources. Additional data may include local, street-level influences of nearby properties on the target properties.

In this example, properties are displayed in a map format through a web page zero footprint interface. Property attributes may be displayed on the map for known properties by combining data values with graphical information system maps. Similarly, neighborhood and community attributes can also be displayed. Initially, the map displays the known current state for each property, including indicators for recent mortgage defaults and properties in the foreclosure process. Geographic information system information is calculated for relationships among properties on the map such as distance calculations between properties.

A user selects an area of the map for further detailed study. The selection criteria, including related geographic information system information, is transformed into XML and passed to an analytics server. An initial predictive model is created with the known current state for the selected properties and other related properties. All input data sources, including the geographic information system information, are used in the creation of the model. After the model is built, all properties within the selected area are scored, and a default likelihood score is assigned for each property. Because of the detailed geographic data for the properties being included in the modeling process, the predictive power of the model is increased. The predictive model could be fit using techniques such as regression, decision trees, or neural networks.

The results of the model building and scoring of the selected properties are returned to the web interface. The map display is updated to reflect each property's likelihood of default. In addition to the detailed property level information, the display will also provide an overall understanding of the default risk for the selected region.

The user can review the predictive model results within the user interface. The user can input policy changes to see their effect on the default likelihood scores in the selected region. The policy changes may be to individual properties, and/or to groups of selected properties that are selected. After the policy changes are input, this information is transformed into XML and passed to the analytic system. The analytic system will rescore the properties in the selected region and calculate new default likelihood scores for properties reflecting the proposed policy changes. The results of the rescoring are returned to the web interface. The map display is then updated to reflect each property's new likelihood of default for consideration by the user.

As a further example, optimization analytic processes may be included to optimally assign students to schools, accounting for desired goals and known constraints. These processes may incorporate forecasts for various measures. Input data for the optimization includes student population counts, student characteristics, school/facility capacities, and teacher/administrator availability. Another source of input data is student and school location data with geographic information system information. This data enables optimization which includes goals of minimal travel time, efficient use of transportation, and other location specific constraints that are a part of local policy.

In this example, student and school locations are displayed in a map format through a zero footprint web user interface. Current student assignment regions can also be displayed on the map. Student, school, and neighborhood attributes may also be displayed on the map. Geographic information system data is calculated for the relationships for all students on the map in relation to the school locations, including distance calculations and street/neighborhood assignments.

The initial display will also include overall measurements related to the desired goals and constraints of the current student assignments. The initial measurements are calculated using the analytic system. The related geographic information system data is transformed into XML and passed to the analytic system. The overall measurements of the desired goals are calculated with an analytic process. The overall measurement results are returned to the user interface and displayed along with the initial map display.

Historical school population data and future projections from third party data sources are then used to create forecasts of future student population groups. The forecasts are created using another analytic process. The forecast results are returned to the web user interface and displayed along with the map display.

The user can then select to optimize the student school assignments using the current student and school attributes. These attributes would include the geographic information system data. Additionally, constraint information and student population forecasts would be input into the mathematical optimization, and the optimization would be done by an analytic process.

The results of the optimization will be returned to the zero footprint web user interface. The results would include the new school assignment for each student. The results would also include the updated overall measurement values for the desired goals of the school assignment project. The web user interface would then update the map display to reflect the new student school assignments. Additionally, new student assignment regions can be displayed on the map.

The user can review the new optimized student school assignments within the web interface. The user can then input policy changes that change the constraints for the optimization. The user can also override proposed student school assignments at the individual level, or by changing the region boundaries of a student assignment region. The user can then select to re-optimize the student school assignments using the updated constraints and overrides. This information is transformed into XML and passed to an analytic process. The analytic process will propose a new optimized solution with the updated input data. The results of the optimization will be returned to the web user interface. The results would include the new student school assignment for each student. The results would also include the updated overall measurement values for the desired goals of the school assignment project. The zero footprint web user interface would then update the map display to reflect the new student school assignments and display the overall measurement values along with the map display.

While examples have been used to disclose the invention, including the best mode, and also to enable any person skilled in the art to make and use the invention, the patentable scope of the invention is defined by claims, and may include other examples that occur to those skilled in the art. Accordingly, the examples disclosed herein are to be considered non-limiting.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data may be stored and implemented in one or more different types of computer-implemented ways, such as different types of data stores (e.g., storage devices, RAM, ROM, Flash memory, flat files, databases, programming data structures, programming variables, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for displaying data, comprising:
    one or more data processors; and
    one or more computer-readable storage mediums containing instructions executable to cause the one or more data processors to perform operations including:
        receiving map data from a geographic information system, wherein the geographic information system is configured to operate on a publically accessible servers;
        generating a map using the map data;
        receiving a selection corresponding to a geographic focus area of the map;
        accessing data associated with a variable, wherein the data associated with the variable includes historical data and is further associated with geographic locations;
        generating an indicator associated with one of the geographic locations, wherein generating the indicator is done using the data associated with the variable;
        providing the indicator for display within the geographic focus area of the map;
        receiving a selection identifying a selected predictive model configured to operate within a secure server;
        communicating information to a secure server, the information depicting the selected predictive model;
        determining a geographic relationship among the geographic locations, wherein determining a geographic relationship is based on the map data;
        receiving a predicted future value for the variable, wherein the predicted future value is predicted by the selected predictive model within the secure server and is predicted based on the data associated with the variable and the geographic relationship, and wherein the secure server is secure from the publically accessible server; and
        updating the indicator based on the predicted future value, wherein updating includes displaying the updated indicator.

2. The system of claim 1, wherein generating the indicator includes coloring the indicator according to the data associated with the variable, and wherein the operations further include:
    modifying the color of the indicator based on the predicted future value for the variable.

3. The system of claim 1, wherein generating the indicator includes generating the indicator to have a border with dimensions determined based on the data associated with the variable, and wherein the operations further include:
    adjusting the border based on the predicted future value for the data associated with the variable.

4. The system of claim 1, wherein the predictive model is based on a regression analysis.

5. The system of claim 1, wherein the secure server is configured to store the data associated with the variable.

6. The system of claim 1, wherein the operations further include:
    facilitating selection of the predictive model from a list of predictive models, wherein facilitating selection includes displaying the list of predictive models, and wherein displaying the list of predictive models includes filtering the list according to an identity of an entity accessing the list.

7. The system of claim 1, wherein displaying the map includes displaying the map in a zero-footprint client environment.

8. The system of claim 7, wherein displaying the map in a zero-footprint client environment includes displaying the map using a web-browser.

9. The system of claim 1, wherein receiving the predicted future value includes receiving the predicted future value by receiving an extensible markup language (XML) transmission made by the secure server.

10. The system of claim 1, wherein the operations further include updating the predicted future value based on a proposed placement of a hospital or a school.

11. A computer-program product for displaying data, the computer-program product tangibly embodied in a machine-readable, non-transitory storage medium, and the computer-program product including instructions executable to cause a data processing apparatus to perform operation including:
    receiving map data from a geographic information system, wherein the geographic information system is disposed within and configured to be operated on a publically accessible server;
    generating a map using the map data;
    receiving a selection corresponding to a geographic focus area the map;
    accessing data associated with a variable, wherein the data associated with the variable includes historical variable data and is further associated with geographic locations;

generating an indicator associated with one of the geographic locations, wherein generating the indicator is done using the data associated with the variable;

providing the indicator for display within the geographic focus area of the map;

receiving a selection identifying a selected predictive model configured to operate within a secure server;

communicating information to a secure server, the information depicting the selected predictive model;

determining a geographic relationship among the geographic locations, wherein determining a geographic relationship is based on the map data;

receiving a predicted future value for the variable, wherein the predicted future value is predicted by the selected predictive model within the secure server and is predicted based on the data associated with the variable and the geographic relationship, and wherein the secure server is secure from the publically accessible server; and updating the indicator based on the predicted future value, wherein updating includes displaying the updated indicator.

12. The computer-program product of claim 11, wherein generating the indicator includes coloring the indicator according to the data associated with the variable, and wherein the operations further include:

modifying the color of the indicator based on the predicted future value for the variable.

13. The computer-program product of claim 11, wherein generating the indicator includes generating the indicator to have a border with dimensions determined based on the data associated with the variable, and wherein the operations further include:

adjusting the border based on the predicted future value for the data associated with the variable.

14. The computer-program product of claim 11, wherein the predictive model is based on a regression analysis.

15. The computer-program product of claim 11, wherein the secure server is configured to store the data associated with the variable.

16. The computer-program product of claim 11, wherein the operations further include:

facilitating selection of the predictive model from a list of predictive models, wherein facilitating selection includes displaying the list of predictive model.

17. The computer-program product of claim 16, wherein displaying the list of predictive models includes filtering the list according to an identity of an entity accessing the list.

18. The computer-program product of claim 11, wherein displaying the map includes displaying the map in a zero-footprint client environment.

19. The computer-program product of claim 18, wherein displaying the map in a zero-footprint client environment includes displaying the map using a web-browser.

20. The computer-program product of claim 11, wherein receiving the predicted future value includes receiving the predicted future value by receiving an extensible markup language (XML) transmission made by the secure server.

21. The computer-program product of claim 11, wherein the operations further include updating the predicted future value based on a proposed placement of a hospital or a school.

* * * * *